(12) United States Patent
Rivera et al.

(10) Patent No.: US 9,182,794 B2
(45) Date of Patent: Nov. 10, 2015

(54) NOTEBOOK METAL HINGE AS HEAT SINK ELEMENT

(71) Applicant: GOOGLE INC., Mountain View, CA (US)

(72) Inventors: Felix Jose Alvarez Rivera, San Jose, CA (US); James Tanner, Los Gatos, CA (US); Michelle Yu, Oakland, CA (US)

(73) Assignee: GOOGLE INC., Mountain View, CA (US)

( * ) Notice: Subject to any disclaimer, the term of this patent is extended or adjusted under 35 U.S.C. 154(b) by 206 days.

(21) Appl. No.: 13/684,542

(22) Filed: Nov. 25, 2012

(65) Prior Publication Data
US 2015/0169014 A1    Jun. 18, 2015

Related U.S. Application Data

(60) Provisional application No. 61/565,430, filed on Nov. 30, 2011.

(51) Int. Cl.
*H05K 7/20*     (2006.01)
*G06F 1/16*     (2006.01)
(Continued)

(52) U.S. Cl.
CPC .............. *G06F 1/203* (2013.01); *G06F 1/1681* (2013.01); *G06F 2200/202* (2013.01)

(58) Field of Classification Search
CPC .............................. G06F 1/161–1/1626; G06F 2200/202–2200/203; G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ........................ 361/679.46–679.54, 688–727, 361/679.26–679.3, 679.55–679.56, 361/679.01–679.61, 679.08–679.2, 361/679.26–679.27, 676–678; 165/80.1–80.5, 104.33, 185; 174/15.1–15.2, 16.1–16.3, 521, 526, 174/547–548; 248/919–923, 176.1, 225, 248/21; 454/185; 345/905; 349/58; 257/712–722, E23.088; 24/453, 24/458–459; 312/236
See application file for complete search history.

(56) References Cited

U.S. PATENT DOCUMENTS 5,901,037 A * 5/1999 Hamilton et al. ............. 361/699
6,026,888 A    2/2000 Moore et al.
(Continued)

FOREIGN PATENT DOCUMENTS

EP    2786222 A1    10/2014
WO    2011/146064 A1    11/2011
(Continued)

OTHER PUBLICATIONS

International Preliminary Report on Patentability issued in corresponding application PCT/US2012/066525, dated Jun. 3, 2014, 7 pages.
(Continued)

*Primary Examiner* — Anthony Haughton
*Assistant Examiner* — Razmeen Gafur
(74) *Attorney, Agent, or Firm* — Brake Hughes Bellermann LLP

(57) ABSTRACT

A computing device can include a base portion housing a central processing unit, a heat exhaust element disposed within the base portion and operable to move air past the central processing unit, a display portion configured to display information to a user, and a metal hinge portion operably coupling the base portion to the display portion and being operable to couple the base portion to the display portion between an open and a closed configuration. The hinge portion can include a hollow cavity extending parallel to a longitudinal axis of the metal hinge and a longitudinal slot in a wall of the metal hinge and parallel to the longitudinal axis, where the longitudinal slot is positioned relative to the heat exhaust element so as to receive air moved by the heat exhaust element through the slot and into the hollow cavity.

20 Claims, 11 Drawing Sheets

(51) Int. Cl.
*G06F 1/20* (2006.01)
*H01L 23/473* (2006.01)

(56) References Cited

U.S. PATENT DOCUMENTS

| | | | | |
|---|---|---|---|---|
| 6,078,499 | A * | 6/2000 | Mok | 361/679.52 |
| 6,175,493 | B1 * | 1/2001 | Gold | 361/679.47 |
| 6,226,180 | B1 | 5/2001 | Ueda et al. | |
| 6,252,767 | B1 * | 6/2001 | Carlson | 361/679.27 |
| 6,297,947 | B1 | 10/2001 | Howell et al. | |
| 6,341,062 | B1 * | 1/2002 | Patel | 361/679.54 |
| 6,507,488 | B1 * | 1/2003 | Cipolla et al. | 361/679.52 |
| 6,507,490 | B2 | 1/2003 | Sasaki et al. | |
| 7,116,552 | B2 * | 10/2006 | Wu | 361/679.26 |
| 7,203,062 | B2 | 4/2007 | Tsuji | |
| 7,450,382 | B1 * | 11/2008 | Fischer et al. | 361/695 |
| 8,514,589 | B2 * | 8/2013 | Mikami | 361/825 |
| 8,891,244 | B2 * | 11/2014 | Yang | 361/755 |
| 2004/0001310 | A1 * | 1/2004 | Chu et al. | 361/687 |
| 2004/0042176 | A1 * | 3/2004 | Niwatsukino et al. | 361/699 |
| 2004/0070942 | A1 * | 4/2004 | Tomioka et al. | 361/700 |
| 2004/0080908 | A1 * | 4/2004 | Wang et al. | 361/687 |
| 2004/0083577 | A1 * | 5/2004 | Lu et al. | 16/367 |
| 2006/0114653 | A1 * | 6/2006 | Seto et al. | 361/695 |
| 2006/0158846 | A1 * | 7/2006 | Craft, Jr. | 361/689 |
| 2006/0176652 | A1 * | 8/2006 | Lin et al. | 361/679 |
| 2007/0131383 | A1 | 6/2007 | Hattori et al. | |
| 2009/0219673 | A1 | 9/2009 | Tamura et al. | |
| 2009/0279258 | A1 * | 11/2009 | Moore et al. | 361/699 |
| 2010/0053885 | A1 * | 3/2010 | Ali | 361/679.54 |
| 2010/0149755 | A1 * | 6/2010 | Tomioka et al. | 361/700 |
| 2010/0321888 | A1 * | 12/2010 | Yamaguchi et al. | 361/695 |
| 2011/0216509 | A1 * | 9/2011 | Mikami | 361/730 |

FOREIGN PATENT DOCUMENTS

| | | |
|---|---|---|
| WO | 2013/081967 A1 | 6/2013 |
| WO | 2013081967 A1 | 6/2013 |

OTHER PUBLICATIONS

Search Report and Written Opinion for International Application No. PCT/US2012/066525, mailed Feb. 19, 2013, 6 pages.
Extended European Search Report from EP Application No. 12853492.2, dated Jun. 22, 2015, 8 pages.

\* cited by examiner

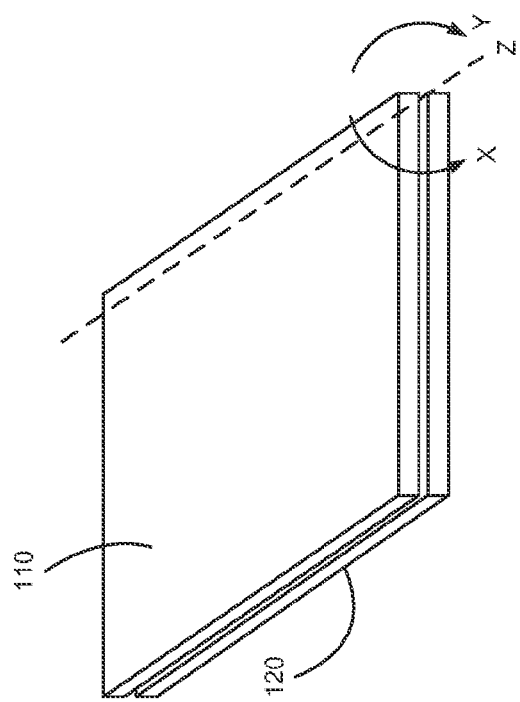
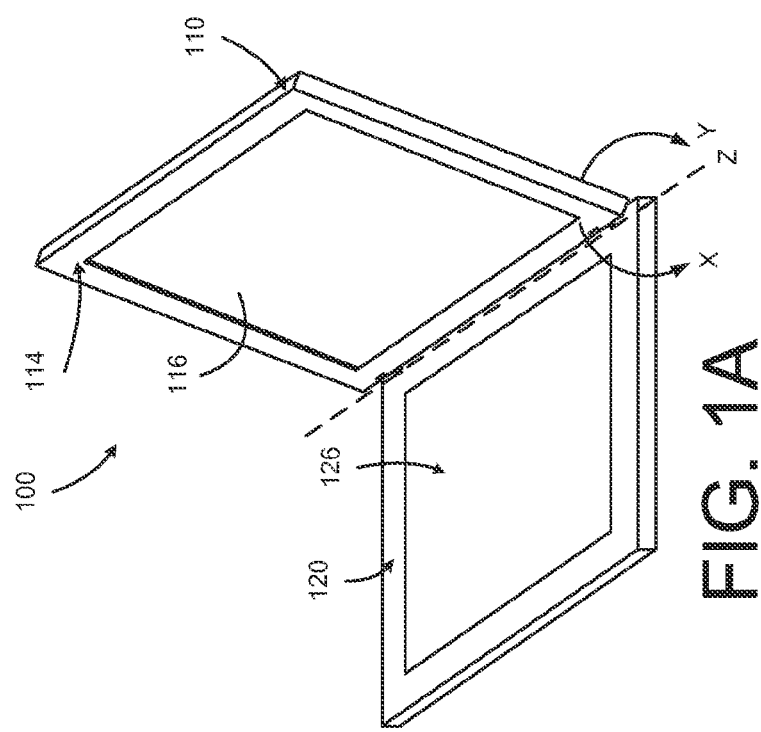

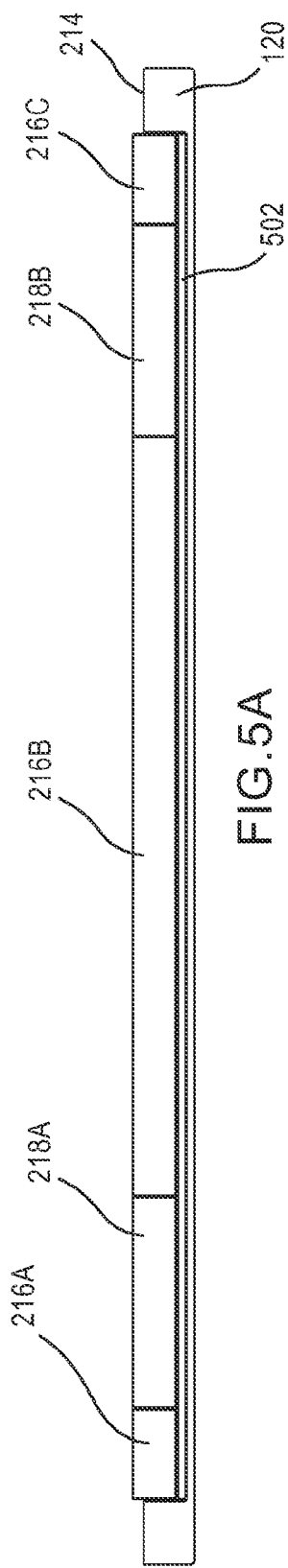
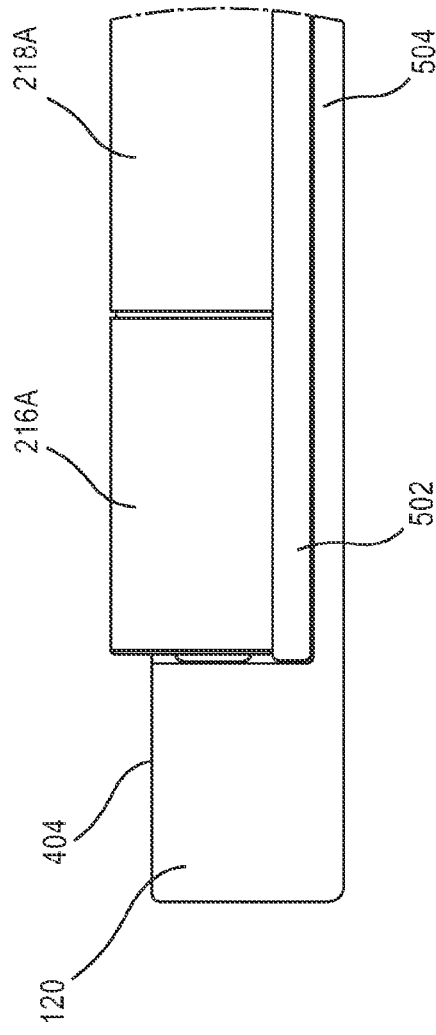
FIG.5A
FIG.5B

NOTEBOOK METAL HINGE AS HEAT SINK ELEMENT

CROSS-REFERENCE TO RELATED APPLICATIONS

This application claims priority to, and the benefit of, U.S. Provisional Application Ser. No. 61/565,430, entitled "NOTEBOOK METAL HINGE AS HEAT SINK ELEMENT," filed on Nov. 30, 2011, the disclosure of which is hereby incorporated herein by reference in its entirety.

TECHNICAL FIELD

This description relates to a heat dissipation within a computing device and, in particular, to a notebook metal hinge used as a heat sink element.

BACKGROUND

Computing devices (e.g., cellphones, tablets, laptop and notebook computers) include components (e.g., processors, memories, hard disks) that generate heat, and the heat must be dissipated from the components so that the components can perform properly. As computing devices become thinner and more compact, the challenge of cooling the central processing unit (CPU) and other components of the computing device while maintaining acceptable surface temperature of enclosures becomes extremely challenging. Thus, there is a need for new techniques to dissipate heat in computing devices.

SUMMARY

In one general aspect, an apparatus includes a base portion, a heat generating element disposed within the base portion, a heat exhaust element disposed within the base portion and operable to transfer heat away from the heat generating element, and a display portion configured to display information to a user. A metal hinge portion operably couples the base portion to the display portion and operates to couple the base portion to the display portion between an open and a closed configuration. The hinge portion is disposed relative to the heat exhaust element such that at least some of the exhausted heat is exhausted away from the heat generating element to the hinge portion and heats the hinge portion.

Implementations can include one or more of the following features. For example, the heat generating element can include a processor. The heat exhaust element can include a fan configured to generate airflow over the heat generating element and toward the metal hinge portion. The metal hinge portion can include a hollow cavity and can include a first opening in an outer wall of the hinge portion, where the opening is configured to receive the airflow, such that the airflow passes through the first opening and into the hollow cavity of the metal hinge portion.

The apparatus can further include an electrically conductive wire electrically coupling the base portion to the display portion, a second opening in an outer wall of the hinge portion configured for receiving the electrically conductive wire from the base portion into the hollow cavity, and a third opening in the outer wall of the hinge portion, where the electrically conductive wire exits the hollow cavity and passes into the display portion through the third opening. A first gasket can be disposed within the third opening and can fit snugly against the at least one electrically conductive wire, such that airflow is substantially prevented from passing through the third opening into the display portion.

The metal hinge portion can include a plurality of metal fins extending substantially perpendicular to an inner wall of the hollow cavity. The metal hinge portion can include a plurality of metal fins extending substantially perpendicular to an outer wall of the hinge portion. The metal hinge portion can include a roughly textured outer wall surface external to the hollow cavity. The metal hinge portion can include aluminum.

In another general aspect, a computing device can include a base portion housing a central processing unit, a heat exhaust element disposed within the base portion and operable to move air past the central processing unit, a display portion configured to display information to a user, and a metal hinge portion operably coupling the base portion to the display portion and being operable to couple the base portion to the display portion between an open and a closed configuration. The hinge portion can include a hollow cavity extending parallel to a longitudinal axis of the metal hinge and a longitudinal slot in a wall of the metal hinge and parallel to the longitudinal axis, where the longitudinal slot is positioned relative to the heat exhaust element so as to receive air moved by the heat exhaust element through the slot and into the hollow cavity.

Implementations can include one or more of the following features. For example, the heat exhaust element can include a fan or includes a piezo-electric diaphragm pump. An airflow of the received air can be received through the longitudinal slot substantially perpendicular to the longitudinal axis. An airflow of the received air can be is received through the longitudinal slot substantially perpendicular to the longitudinal axis. The metal hinge portion can include a plurality of metal fins extending substantially perpendicular to an inner wall of the hollow cavity.

The metal hinge portion can include an opening at an end of the metal hinge portion through which received air exits the hollow cavity. An airflow of the received air can be received through the longitudinal slot substantially in a direction that includes a component parallel to the longitudinal axis. An airflow of the received air can be received through the longitudinal slot, where the airflow through the longitudinal slot has a velocity of at least two meters per second. The base portion can include no cooling vents visible from outside the base computing device. The metal hinge portion can obscure an outlet of the heat exhaust element from view from outside the computing device.

The details of one or more implementations are set forth in the accompanying drawings and the description below. Other features will be apparent from the description and drawings, and from the claims.

BRIEF DESCRIPTION OF THE DRAWINGS

FIGS. 1A and 1B are diagrams of a computing device in an open configuration and in a closed configuration, respectively.

FIG. 5A is a side view of a hinge portion connected to the base portion of the computing device.

FIG. 5B is a side view of a corner of a base portion of the computing device and a hinge portion attached to the base portion.

DETAILED DESCRIPTION

Figure 2:
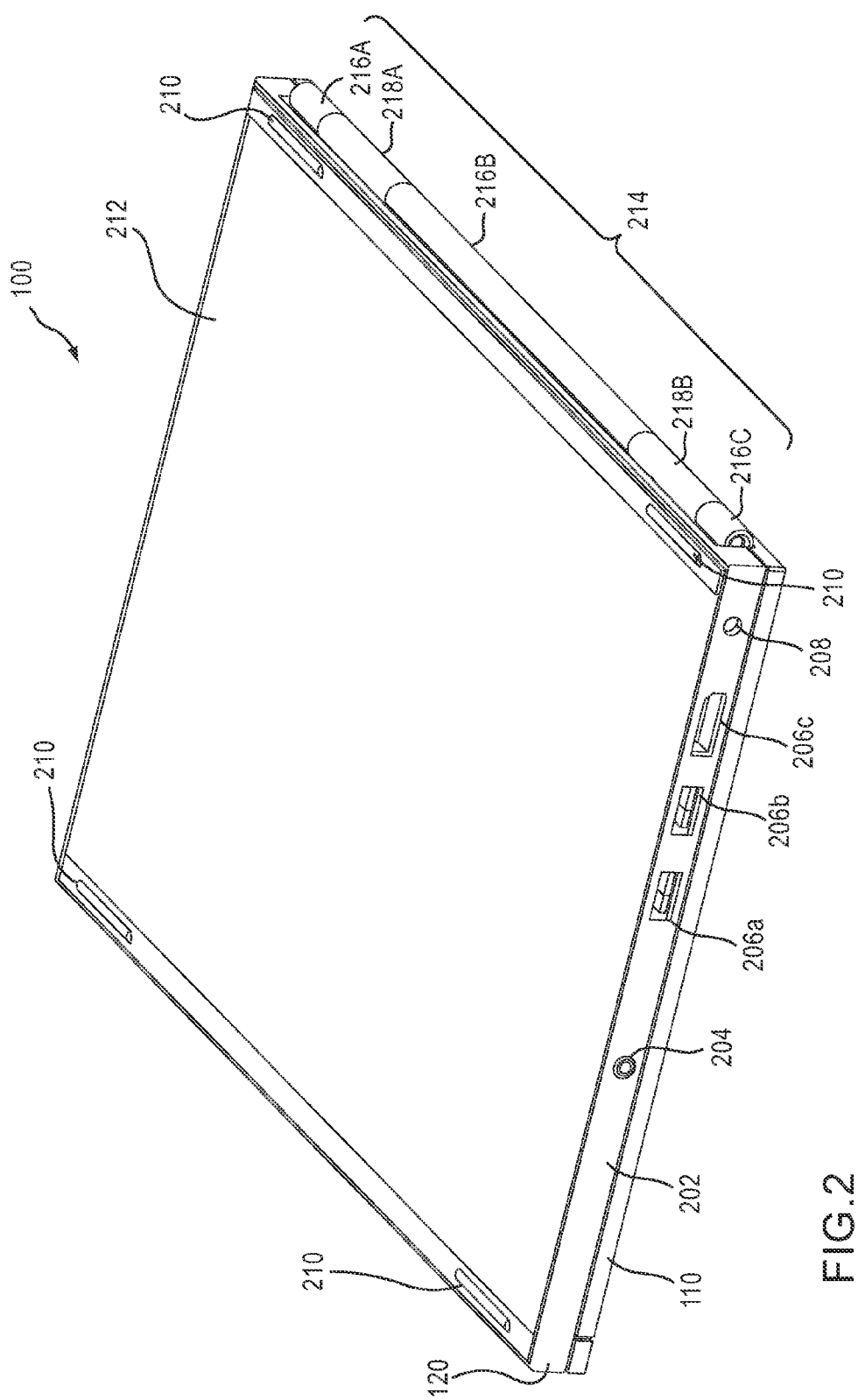
FIG. 2 is a perspective view of an underside of the computing device 100 in a closed configuration.

FIGS. 1A and 1B are perspective views of a notebook computing device 100 in an open and closed configuration, respectively. The computing device 100 includes a display portion 110 operably coupled (e.g., rotatably coupled) to a base portion 120. As shown in FIG. 1A, the base portion 120 includes a device input region 126, and the display bezel 114 of the display portion 110 is disposed around a display 116. In other words, at least a portion of the display 116 is disposed within at least a portion of the display bezel 114.

As mentioned above, FIGS. 1A and 1B are diagrams of the computing device 100 in an open configuration and in a closed configuration, respectively. When the computing device 100 is in the open configuration, the display portion 110 can be referred to as being in an open position with respect to the base portion 120. The display 116 of the display portion 110 does not directly face the device input region 126 of the base portion 120 when the computing device 100 is in the open configuration. The display 116 of the display portion 110 can be viewed by a user when the computing device 100 is in the open configuration. Similarly, the device input region 126 of the base portion 120 can also be accessed and used (e.g., used by a user) to trigger one more functions of the computing device 100 when the computing device 100 is in the open configuration. The display 116 of the display portion 110 can be aligned along a plane that is nonparallel to a plane along which the base portion 120 (e.g., a bottom surface and/or a top surface of the base portion 120) is aligned when the computing device 100 is in the open configuration. Although not shown in FIGS. 1A and 1B, the input region 126 can include various types of input devices such as, for example, a keyboard, one or more buttons, an electrostatic touchpad to control a mouse cursor, etc.

When the computing device 100 is in the closed configuration, the display portion 110 can be referred to as being in a closed position with respect to the base portion 120. The display 116 of the display portion 110 of the computing device 100 faces (and may cover) the input region 126 of the base portion 120 of the computing device 100 when the computing device 100 is in the closed configuration. When in the closed configuration, the display portion 110 (or the display surface of the display 116) can be aligned along a plane that is substantially parallel to a plane along which the base portion 120 (e.g., a bottom surface and/or a top surface of the base portion 120) is aligned. In some embodiments, the display portion 110 (e.g., the display bezel 114) may be contacting (or nearly contacting) the base portion 120 when the computing device 100 is in the closed configuration.

The computing device 100 can be moved from the open configuration shown in FIG. 1A to the closed configuration shown in FIG. 1B by rotating (e.g., rotatably moving) the display portion 110 in a counterclockwise direction X with respect to the base portion 120. Also, the computing device 100 can be moved (e.g., rotatably move) from the closed configuration shown in FIG. 1B to the open configuration shown in FIG. 1A by rotating the display portion 110 in a clockwise direction Y with respect to the base portion 120. The display portion 110 is configured to rotate about an axis Z, which can be through one or more hinge portions (not shown) used to couple the display portion 110 to the base portion 120.

Although not shown in FIGS. 1A and 1B, the computing device 100 can have many open configurations, where the display 116 of the display portion 110 is aligned along a plane that is nonparallel to a plane along which the base portion 120 is aligned. In other words, the display portion 110 can be moved between various open positions with respect to the base portion 120 where the display 116 may be viewed and/or the device input region 126 may be accessed by, for example, a user.

In some embodiments, the display 116 of the computing device 100 can have a display surface (also can be referred to as a viewable surface) upon which illuminated objects can be displayed and viewed by a user. In some embodiments, the display 116 included in the display portion 110 can be, for example, a touch sensitive display. In some embodiments, the display 116 can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If a touch sensitive device, the display 116 can function as an input device. For example, the display 116 can be configured to display a virtual keyboard (e.g., emulate a keyboard) that can be used by a user as an input device.

Although not shown, in some embodiments, the display portion 110 and/or the base portion 120 can include various computing components (e.g., internal computing components) such as one or more processors, a graphics processor, a motherboard, a memory (e.g., a disk drive, a solid-state drive), and/or so forth. One or more images displayed on the display 116 of the display portion 110 can be triggered by the computing components included in the base portion 120. In some embodiments, the computing device 100 can include one or more wires configured to handle signaling (e.g., video signals, signals generated in response to interactions with the display) between the display portion 110 and the base portion 120.

As shown in FIGS. 1A and 1B, the computing device 100 can be a personal computing laptop-type device. In some embodiments, the computing device 100 can be any type of computing device. The computing device 100 can be, for example, a wired device and/or a wireless device (e.g., wi-fi enabled device) and can be, for example, a tablet-type computing device, a computing entity (e.g., a personal computing device), a server device (e.g., a web server), a mobile phone, a personal digital assistant (PDA), and/or so forth. The computing device 100 can be configured to operate based on one or more platforms (e.g., one or more similar or different platforms) that can include one or more types of hardware, software, firmware, operating systems, runtime libraries, and/or so forth. More details related to various configurations of a computing device that has a display portion configured to move with respect to a base portion are described in connection with the figures below.

FIG. 2 is a perspective view of an underside of the computing device 100 in a closed configuration. The base portion 120 is parallel to the display portion 110, and a display surface of the display portion is hidden from view. A housing sidewall 202 of the base portion 120 can include one or more input/output connections to electrical components disposed within the housing of the base portion. For example, the housing sidewall 202 can include a jack socket 204 adapted for receiving a jack plug to provide an electrical connection between electrical components located within the base portion 120 and electrical components located external to the computing device 100. The housing sidewall 202 can include one or more data connectors 206A, 206B, 206C (e.g., USB ports, IEEE 1394 ports, etc.). The housing sidewall 202 can include a power jack socket 208 adapted for receiving an electrical power connector for providing power to electrical components located within the base portion 120.

The underside of the base portion 120 can include multiple nonskid feet 210 that protrude above an underside surface of the base portion 120. When placed in a normal operating position, the base portion 120 of the computing device 100 can be supported on a flat surface by the plurality of nonskid feet 210. Other than the nonskid feet 210, the underside surface 212 of the base portion 120 can be smooth and substantially devoid of any cooling vent patterns. For example, the surface 212 can be absent of a grille of parallel longitudinal openings or a pattern of circular openings in the surface through which air can enter or exit to cool components within the base portion 120. By omitting such cooling vents on the surface 212 and other surfaces of the base portion 120, and instead allowing cooling air to enter and exit the base portion as described in more detail below, an appealing design of the computing device 100 can be provided. Cooling vent patterns (e.g., parallel longitudinal openings, patterns of circular openings, etc.) can be omitted from all surfaces of the base portion 120 to provide a sleek, appealing design of the computing device 100.

A hinge portion 214 can couple the base portion 120 to the display portion 110. As described in more detail below, the hinge portion 214 can include multiple elements. For example, the hinge element 214 can include base hinge elements 216A, 216B, 216C that are attached to the base portion and display hinge elements 218A, 218B that are attached to the display portion 110.

Figure 3:
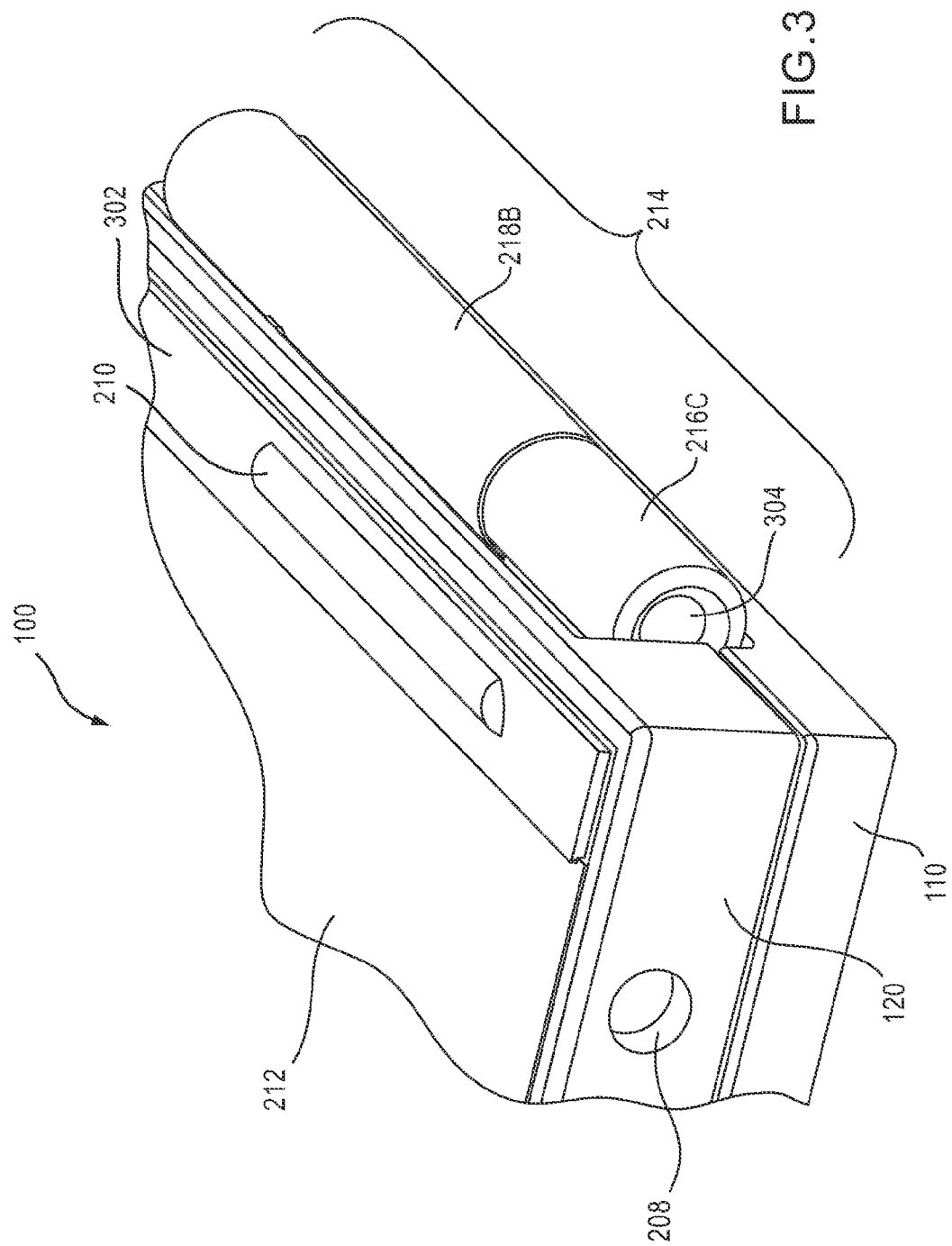
FIG. 3 is a partial perspective view of a corner of the computing device 100 seen from an underside of the device.

FIG. 3 is a partial perspective view of a corner of the computing device 100 as seen from an underside of the device. As seen in FIG. 3, the nonskid feet 210 can protrude from a slightly elevated rail 302 to add an edge of the bottom surface 212. As described above, the hinge portion 214 includes a base hinge element 216C and a display hinge element 218B. One or both of the hinge elements 216C, 218B can be at least partially hollow and can include a cavity within the element(s) through which air may flow. For example, as described in more detail below, air may flow into a hollow cavity of the hinge element and may travel down the length of the hinge element and then may flow out of an opening 304 at an end of the hinge portion 214 and into the environment surrounding the computing device 100.

Figure 4:
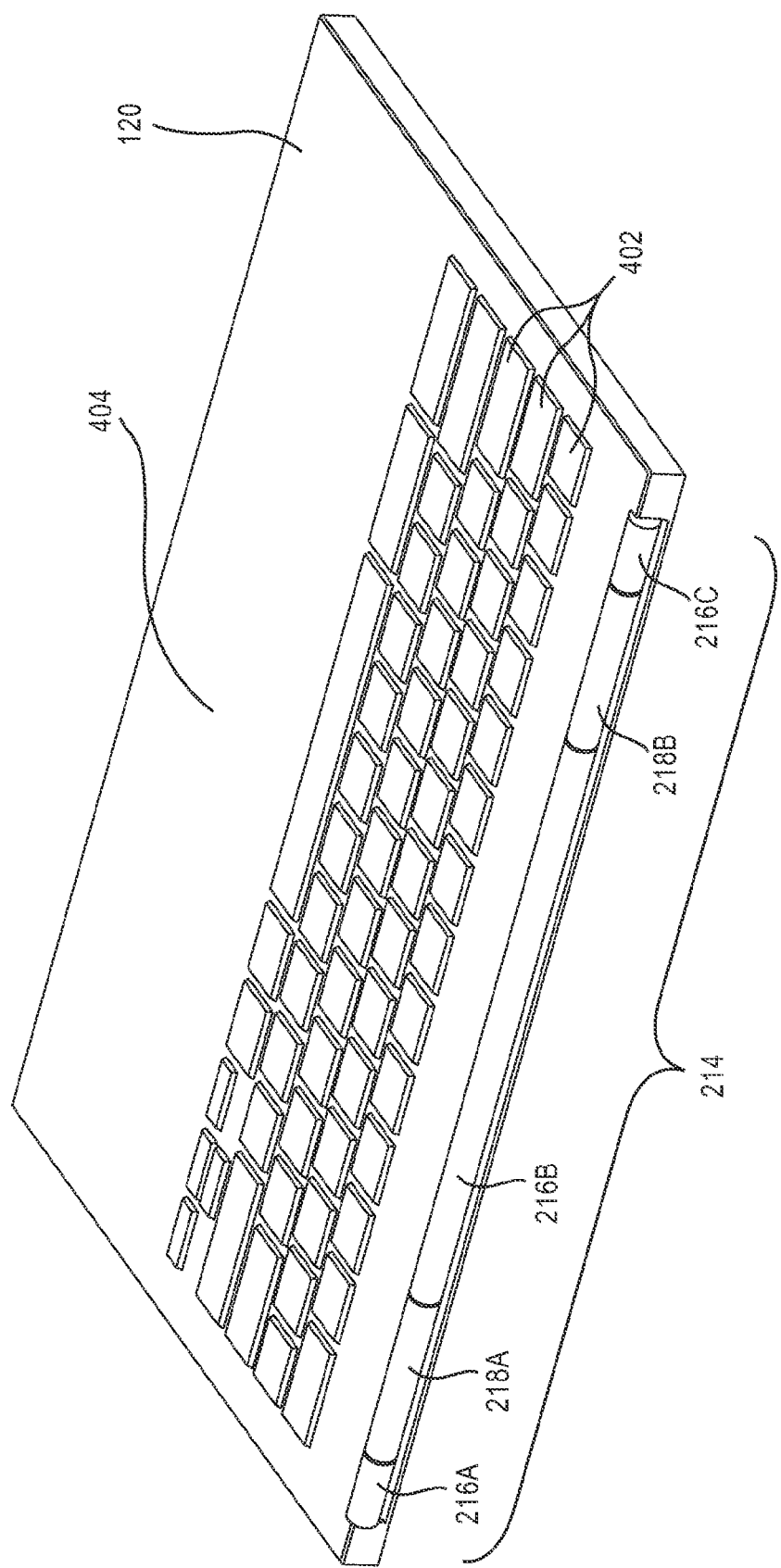
FIG. 4 is a perspective view of a base portion of the computing device seen from a top side of the base portion.

FIG. 4 is a perspective view of the base portion 120 of the computing device 100 seen from a top side of the base portion. The base portion 120 can include a plurality of input keys 402 that together can form a keyboard for inputting information to the computing device 100. The input keys 402 can protrude upward from a generally smooth and flat surface 404 on the top side of the base portion 120. The surface 404, like the surface 212 on the bottom side of the base portion, can be substantially devoid of any cooling vent patterns to provide a sleek and appealing appearance for the computing device. The hinge portion 214, including display hinge elements 218A, 218B and base hinge elements 216A, 216B, 216C, can be located at an edge of the base portion.

FIG. 5A is a side view of the hinge portion 214 (including base hinge elements 216A, 216B, 216C and display hinge elements 218A, 218B) connected to a back edge of the base portion 120 of the computing device 100. FIG. 5B is a side view of a corner of the base portion 120 of the computing device 100 including the hinge portion 214 attached to the base portion. As shown in FIG. 5A and FIG. 5B, the hinge portion 214 extends above a surface 404 of the base portion 120. In addition, a small air gap 502 is located between the hinge portion 214 and a bottom edge 504 of the base portion 120. In some implementations, air can pass through the air gap 502 between the interior of the base portion 120 and the environment outside the computing device 100, so that heat can be exhausted from components heat generating components (e.g., a central processing unit, a graphics processing unit, a memory device, a hard disk drive, a chipset, etc.) in the interior of the base portion 120 the environment outside computing device 100.

Figure 6:
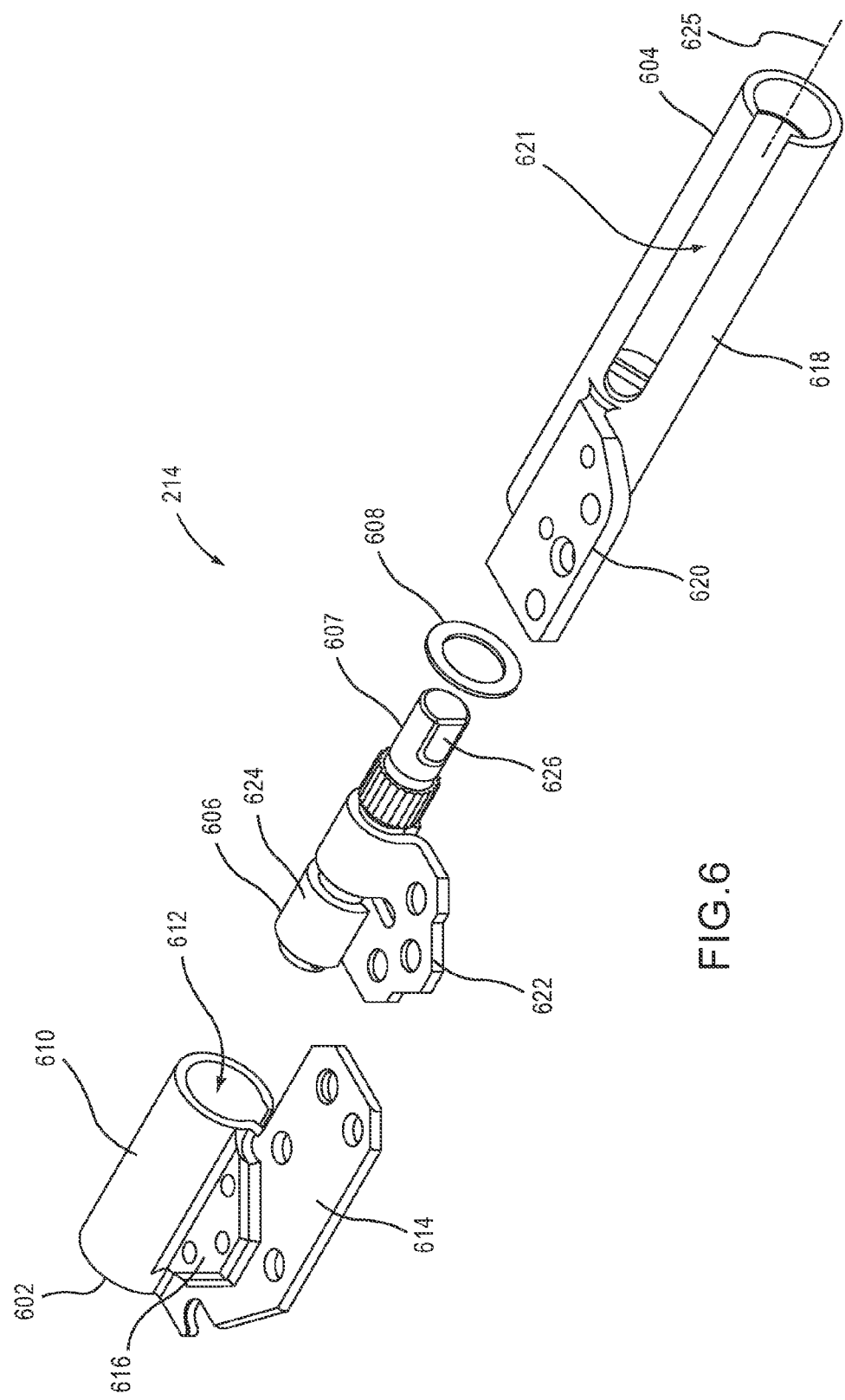
FIG. 6 is an exploded perspective view of components of the hinge portion of the computing device.

FIG. 6 is an exploded perspective view of components of the hinge portion 214 of the computing device 100. The hinge portion 214 can include a base hinge element 602, a display hinge element 604, the friction band 606, a friction shaft 607, and a washer 608. Any or all of the base hinge element 602, the display hinge element 604, the friction band 606, and the friction shaft 607 can be made of a material with a high heat conductivity, for example, a metal, such as aluminum. Any or all of the base hinge element 602, the display hinge element 604, the friction band 606, and the friction shaft 607 can include a hollow interior cavity through which wires can pass to conduct electrical signals between the base portion 120 and the display portion 110.

The base hinge element 602 can include a generally cylindrical barrel 610 that includes a hollow cavity 612. The generally cylindrical barrel 610 is secured to a flat tab 614 that can be fastened to the base portion 120. In one implementation, the cylindrical barrel 610 can be attached to a tang 616 that is secured to the flat tab 614. For example, the cylindrical barrel 610 can be integrally formed (e.g., die cast) with the tang 616, and the tang 616 then can be fastened (e.g., screwed, glued, etc.) to the tab 614. In other implementations, the cylindrical barrel 610 can be separately formed from the tang 616, and then the barrel 610 and the tang 616 can be joined together (e.g., by welding, gluing, bonding, etc.). The display hinge element 604 can include a generally cylindrical barrel 618 that includes a hollow cavity. The barrel 618 can be attached to a tab 620 that can be fastened (e.g., screwed, bolted, glued, etc.) to the display portion 110. The barrel 618 can include an opening slot 621 in a wall of the barrel. In some implementations, electrically conductive wires can pass through the slot 621 and into the display portion 110 to conduct signals to the display portion 110 from components in the base portion 120. A gasket (not shown) can fit snugly within the opening slot 621 and around any wires that pass through the opening slot to inhibit airflow from the hollow cavity of the barrel 618 to the display portion 110.

The base hinge element 602 can be coupled to the display hinge element 604 by the friction band 606 and the friction shaft 607. For example, the friction shaft can include a tab 622 that can be fastened to tab 614 when a barrel 624 of the friction band 606 is slid into the interior cavity 612 of the base hinge element 602 or when the barrel 624 is adjacent to the cavity 612 in a direction along a longitudinal central axis 625 of the barrel 610 and the barrel 618. One end of the friction shaft 607 can fit snugly within an interior hollow cavity of the barrel 624. Another end 626 of the friction shaft 607 can fit snugly (e.g., via a press fit connection) within the hollow cavity of the cylindrical display hinge portion 604. Then, when the display hinge element 604 is rotated about the axis 625 (e.g., to move the display portion 110 relative to the base portion 120 from a closed configuration to an open configuration), the shaft 607 can be rotated within the friction band 606. Because of the friction due to the snug fit between the friction shaft 607 within the interior hollow cavity of the barrel 624 of the friction band 606, a user feels some resistance when moving the display portion 110 relative to the base portion 120 between the open and closed configurations of the computing device 100.

Figure 7:
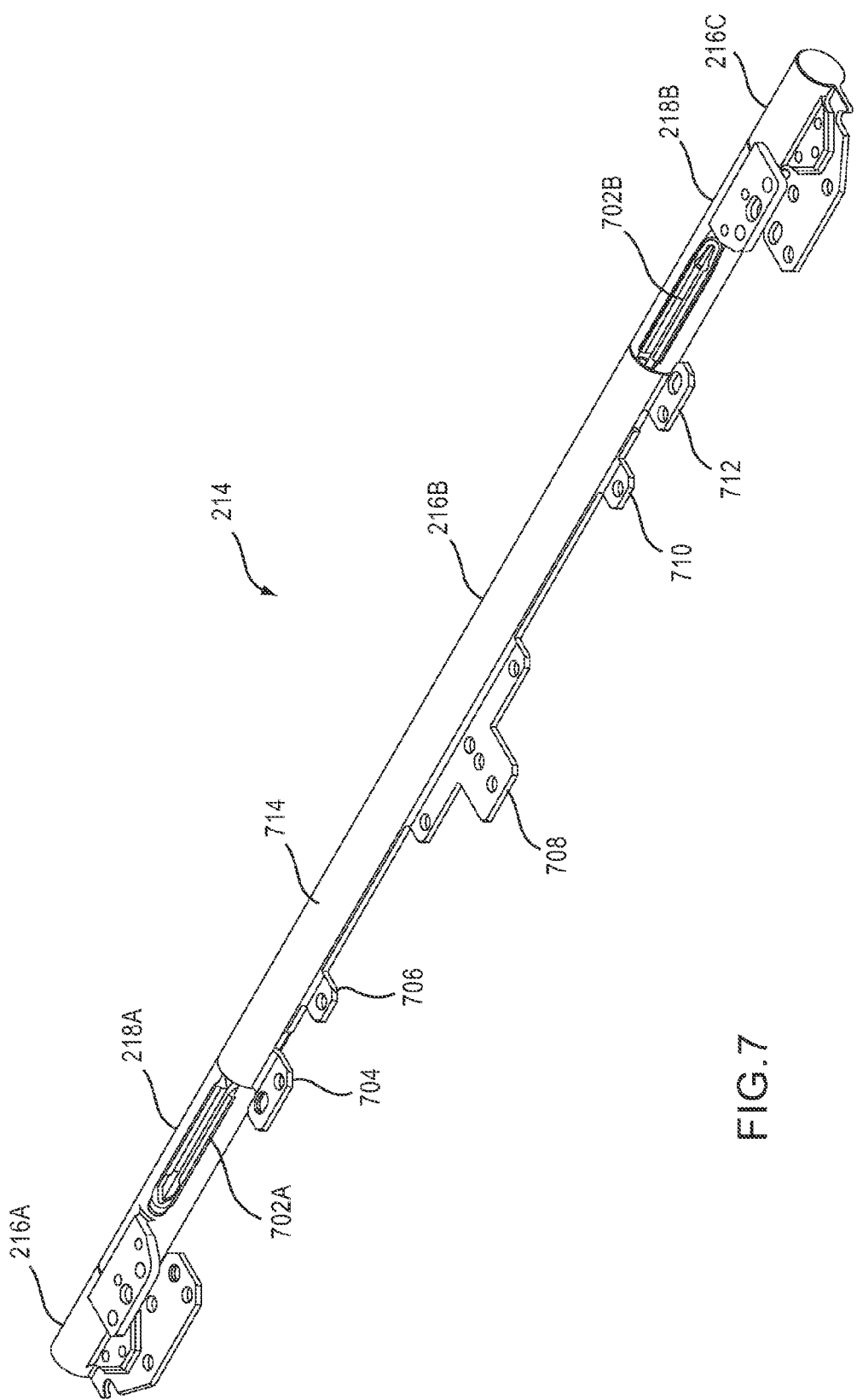
FIG. 7 is a perspective view of the hinge portion of the computing device.

FIG. 7 is a perspective view of the hinge portion 214 of the computing device. As shown in FIG. 7, the hinge portion 214 can include a plurality of base hinge elements 216A, 216B, 216C that can be attached to the base portion 120 and a plurality of display hinge elements 218A, 218B that can be attached to the display portion 110. As described above, the base hinge elements 216A, 216B, 216C can include one or more tabs for securing the base hinge elements to the base portion 120 and the display hinge elements 218A, 218B can include one or more tabs for securing the display hinge elements to the display portion 110. The display hinge elements 218A, 218B can include opening slots 702A, 702B, respectively, through which wires that electrically connect the display portion to the base portion can pass. A center base hinge element 216B can include multiple tabs 704, 706, 708, 710, 712 that are connected to a barrel 714 of the base hinge element 216B and that secure the base hinge element 216B to the base portion 120.

Figure 8:
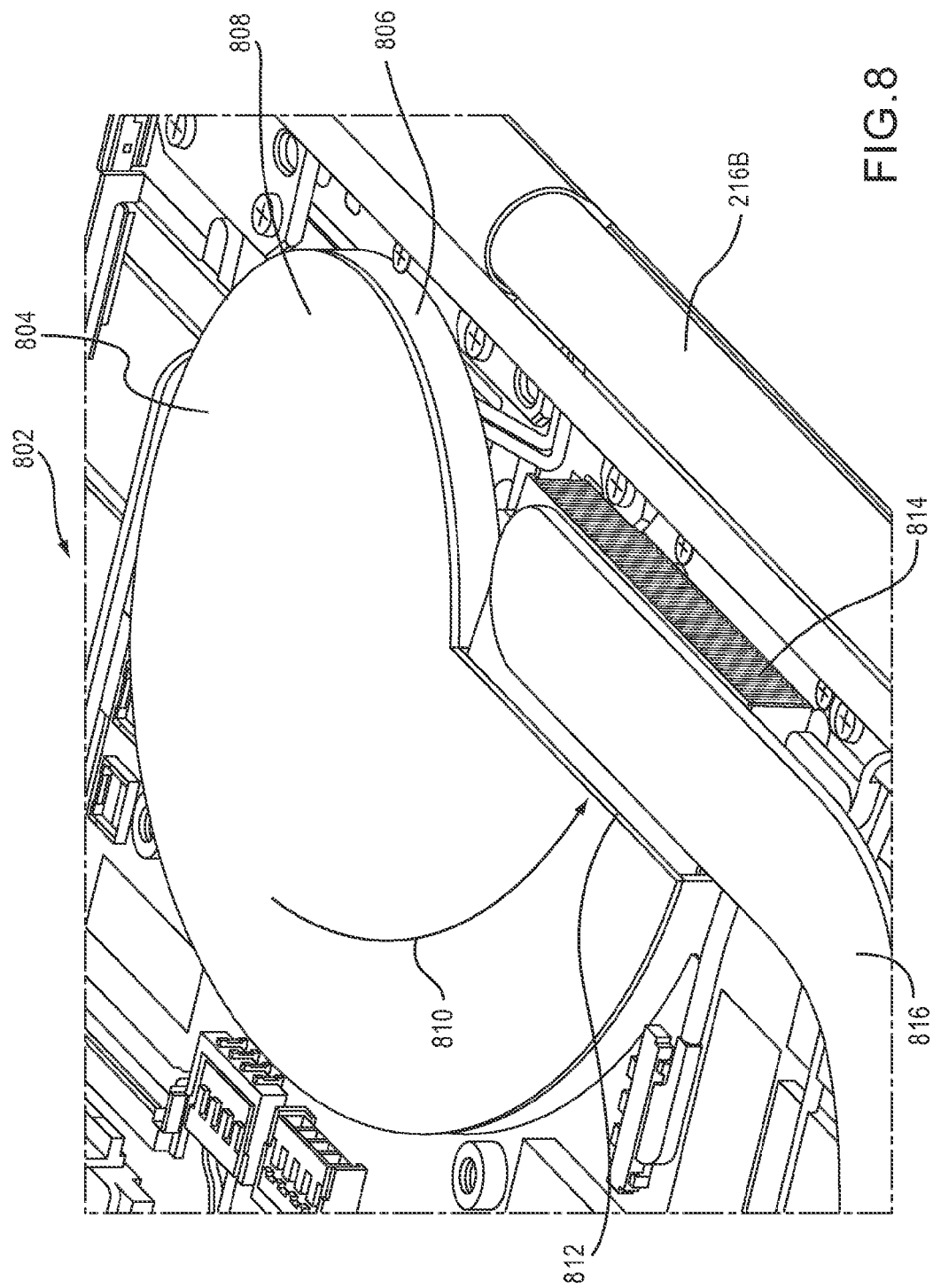
FIG. 8 is a perspective view of a heat exhaust element disposed within the base portion of the computing device.

FIG. 8 is a perspective cutaway view of a heat exhaust element 802 disposed within the base portion of the computing device. The exhaust element 802 can include a fan 804 that moves air within the base portion 120, where the air transfers heat away from heat producing elements (e.g., processors, memories, disk drives etc.) within the base portion to maintain acceptable operating temperatures for components within the base portion. In one implementation, the fan 804 can draw air into the body of the fan through inlet ports in the sidewalls 806 of the fan, or through inlet ports in a top wall 808 of the fan, or through inlet ports in a bottom wall (not shown) of the fan. The airflow within the interior of the base portion 120 provided by the air that is drawn into the fan can pass over heat generating elements within the base portion and can transfer heat away from those elements. The fan 804 can move air within a duct of the fan in a direction shown by arrow 810 and then expel the air through an outlet port 812 of the fan. The expelled air can pass through an array of high thermal conductivity heat sink fans 814 that are in contact with a high thermal conductivity finger 816 that can draw heat away from the fans as the fins absorb heat from the expelled air that passes over them. The finger 816 then can radiate heat into the external environment. Air exhausted from the fan 804 that passes through the fins 814 can be directed to the hinge portion 214. For example, expelled air can be directed to a base hinge portion 216B that can absorb additional heat from the expelled air and then radiate that heat away to the external environment. Thus, the hinge portion 214 provides additional surface area from which to radiate heat that is generated by components within the base portion 120. By distributing the heat over a larger surface area, heat may be radiated more effectively and the radiating surfaces may have relatively lower temperatures than a device with less surface area.

Figure 9:
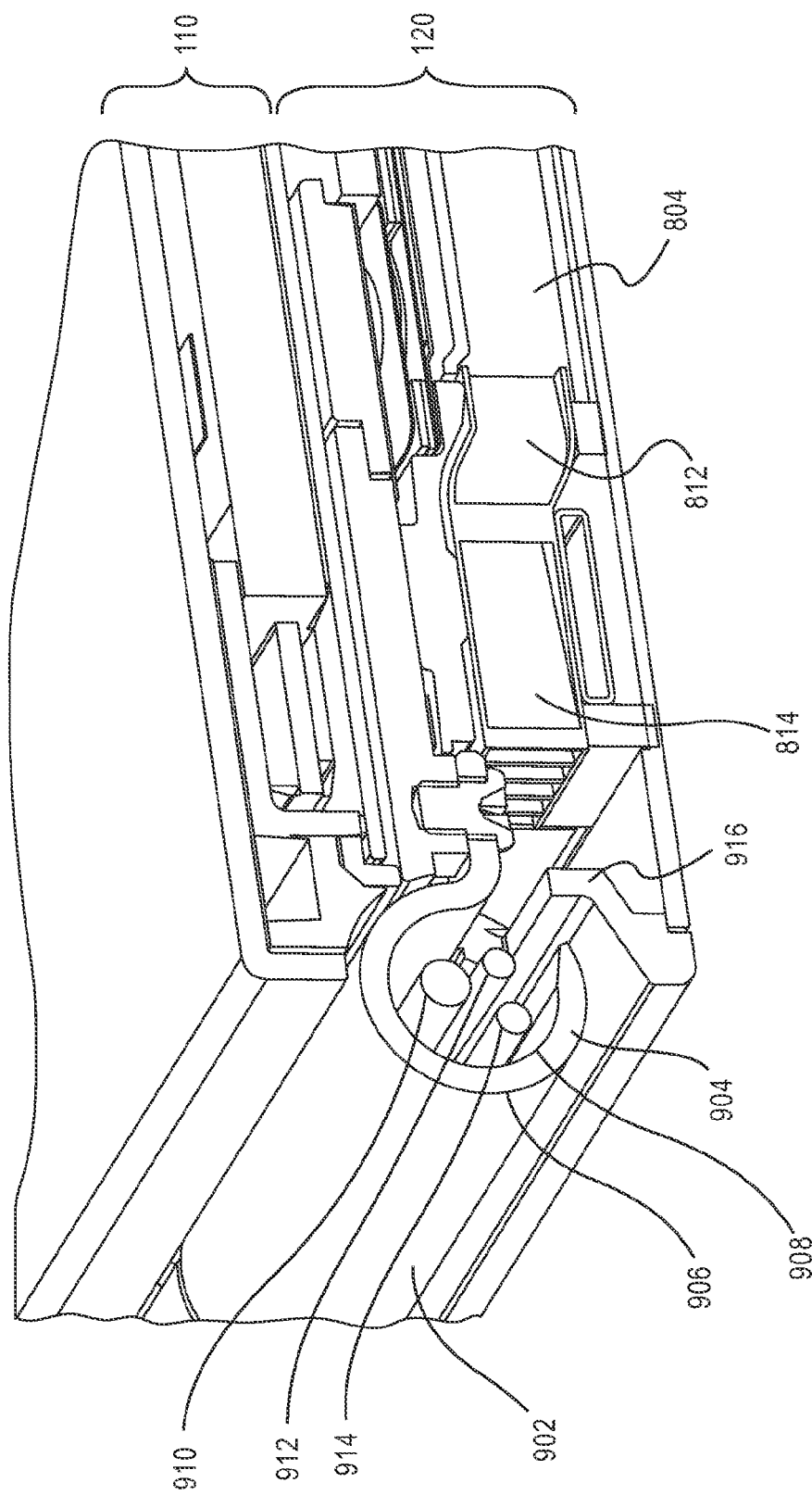
FIG. 9 is a cross-sectional view of the computing device including the base portion, the display portion, and the hinge portion.

FIG. 9 is a cross-sectional view of the computing device including the base portion 120, the display portion 110, and the hinge portion. The hinge portion can include a hinge barrel 902 that has a wall 904, where the wall has an outer surface 906 and an inner surface 908. The hinge barrel 902 is substantially cylindrically shaped, and the inner wall 908 defines an interior cavity of the hinge barrel extending parallel to the longitudinal axis of the hinge barrel. A plurality of electrical wires 910, 912, 914 can pass through the hollow cavity. Although the hinge barrel 902 is generally cylindrically shaped, at least a portion of the wall 904 of the hinge barrel does not extend completely around 360° to form a true cylinder. Rather, a longitudinal slot exists in the hinge barrel and can extend parallel to the longitudinal axis.

The fan 804 within the base portion 120 can exhaust air through a tapered outlet port 812 toward an array of high thermal conductivity heat sink fins 814 that absorb heat from the exhausted air and then radiate the heat. Exhaust air that passes through the heat sink fins 814 is directed through the longitudinal slot in the wall 904 of the hinge barrel 902 and into the hollow cavity of the hinge barrel. The hot exhaust air can circulate within the hollow cavity of the hinge barrel 902 and transfer heat to the wall 904 of the hinge barrel. In some implementations the transfer of heat can raise the temperature of hinge barrel 902 to a temperature above an ambient temperature of an immediate environment of the apparatus. Heat transferred to the hinge barrel wall 904 can be radiated away from the hinge barrel and into the environment around the computing device 100. The configuration of the fan 804, the outlet port 812, the heat sink fins 814, and the hinge barrel 902 within the computing device can be arranged to promote the transfer of heat from the air exhausted from the fan to the hinge barrel 902, so that the hinge barrel can radiate the exhausted heat into the environment around the computing device 100. In addition, the configuration of the fan 804, the heat sink fins 814, and the hinge barrel 902 can be arranged so that neither the longitudinal slot in the wall 904, nor the heat sink fins 814 are visible to a user from outside the computing device 100 when the device is in a normal operating position for the user. In particular, the longitudinal slot can be hidden from view by the wall 904 and the hinge barrel itself can hide the heat fins 814. By hiding the longitudinal slot of the hinge barrel 902 and the heat sink fans 814 an appealing, sleek outer design of the computing device 100 can be provided.

The inner surface 908 of the hinge barrel can include a plurality of metal fins (not shown) extending substantially perpendicular to the inner surface to increase the surface area of the hinge barrel wall 904 that hot exhaust air comes in contact with, so that the barrel wall 904 efficiently absorbs heat from the exhausted air. In some implementations, the outer wall 906 can include a plurality of fins (not shown) extending substantially perpendicular to the outer surface to increase the surface area of the hinge barrel wall 908, so that the hinge barrel can efficiently radiate heat into the environment surrounding the computing device 100. In some implementations, the inner surface 908 and/or the outer surface 906 of the hinge barrel can be textured to increase its surface area so that the inner surface may efficiently absorb heat from the exhaust air or so that the outer surface can efficiently radiate heat from the hinge barrel into the surrounding environment.

In some implementations, the air that is exhausted by the fan 804 into the inner cavity of the hinge barrel 902 can be directed toward the inner cavity in a direction that has a component parallel to the longitudinal axis of the hinge barrel. For example, the fan 804 or the heat sink fans 814 can be configured to exhaust the air in such a direction. Then, when the air circulates within the hollow cavity of the hinge barrel 902 the circulating air may travel down the length of the hinge barrel 902 and may flow out of an opening 304 at an end of the hinge portion 214 and into the environment surrounding the computing device 100. Some air that is exhausted by the fan 804 through the heat sink fins 814 toward the hinge barrel 902 may not pass through the longitudinal slot into the hollow cavity but rather may pass thorough a gap between the wall 904 of the hinge barrel and a frame member 916 of the base portion 120 to exhaust heat into the environment surrounding the computing device 100.

Figure 10:
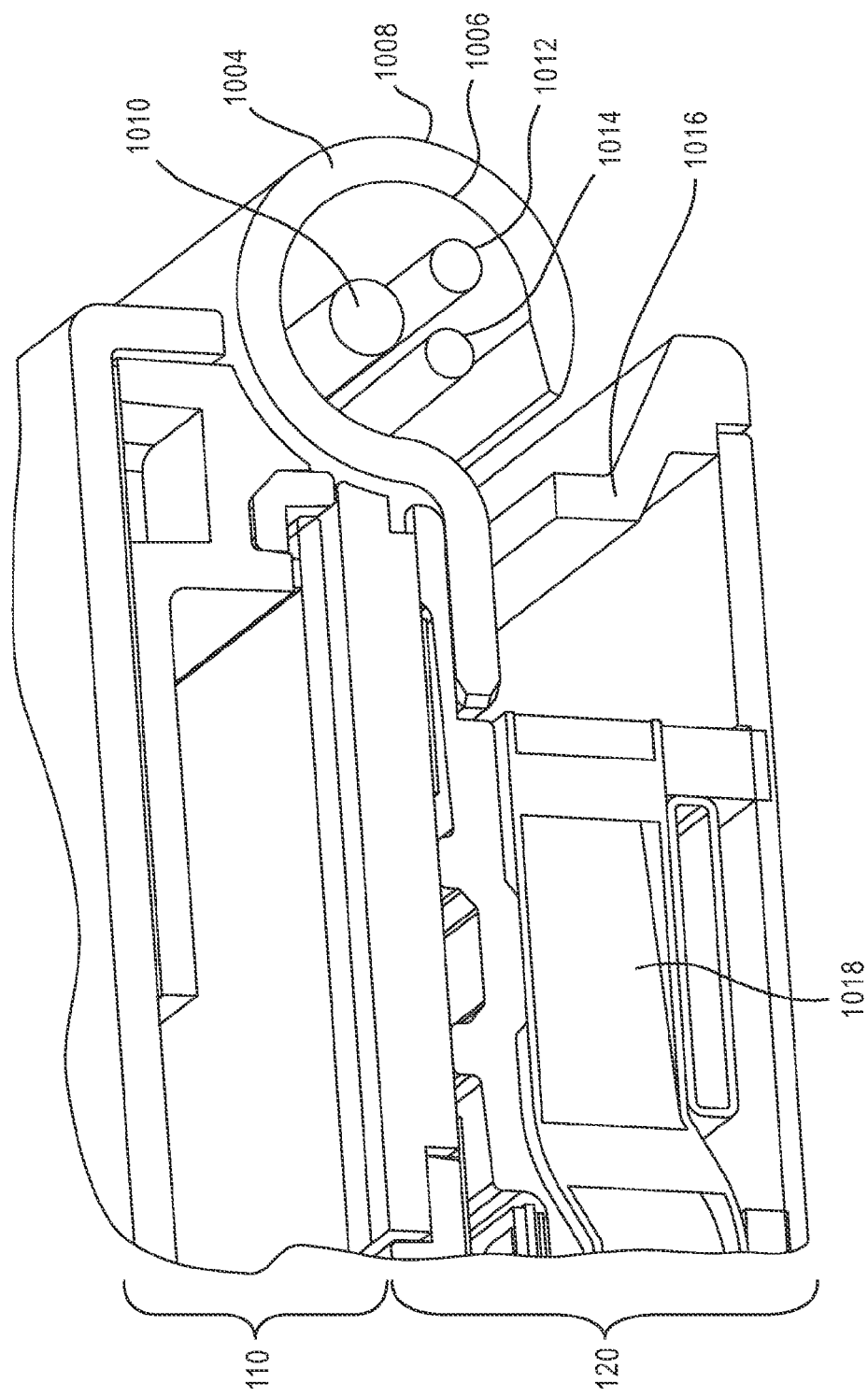
FIG. 10 is another cross-sectional view of the computing device including the base portion, the display portion, and the hinge portion.

FIG. 10 is another cross-sectional view of the computing device including the base portion 120, the display portion 110, and the hinge portion. The hinge portion can include a generally cylindrical hinge barrel that has a wall 1004 that with an outer surface 1008 and an inner surface 1006. Multiple wires 1010, 1012, 1014 can be located within an inner cavity defined by the generally cylindrical shape of the hinge barrel wall 1004. As shown in FIG. 10, a tapered exhaust duct 1018 can direct exhaust air from a heat exhaust unit (e.g., a fan) out of an outlet port of the heat exhaust unit toward the exterior of the computing device. In contrast to the heat exhaust unit shown in FIG. 9, the implementation shown in FIG. 10 may not include an array of heat sink fins. Rather, exhaust air can be directed from the exhaust port directly through a gap between 1020 of the hinge barrel and an outer frame member 1016 of the base portion into the interior cavity of the hinge barrel. Then, the hot exhaust air can transfer heat to the metal wall of the hinge barrel 1004, and the hinge barrel wall can radiate the heat into the environment surrounding the computing device 100. By omitting the array of heat sink fins, space within the base portion of the computing device can be conserved, and the surface area of the hinge portion can be used to dissipate heat from a heat generating components within the base portion 120.

To replenish air that is exhausted out of the base portion 120, air can enter the base portion through various small gaps in the housing of the computing device 100. For example, air can flow into the base end portion through a gap between the outer surface 1008 of the hinge barrel wall and a top housing member 1022 of the base portion. The airflow over the outer surface 1008 of the hinge barrel into the base portion can dissipate heat from the hinge barrel wall 1004. In another example, referring again to FIG. 7, air can enter the base portion 120 through gaps between hinge barrel elements of base hinge portions 216A and 216C and base portion frame members proximate to those base hinge portions, while area is exhausted from the base portion 120 through a gap between a hinge barrel element of base hinge portion 216B and a base portion frame member proximate to that base end portion.

Figure 11:
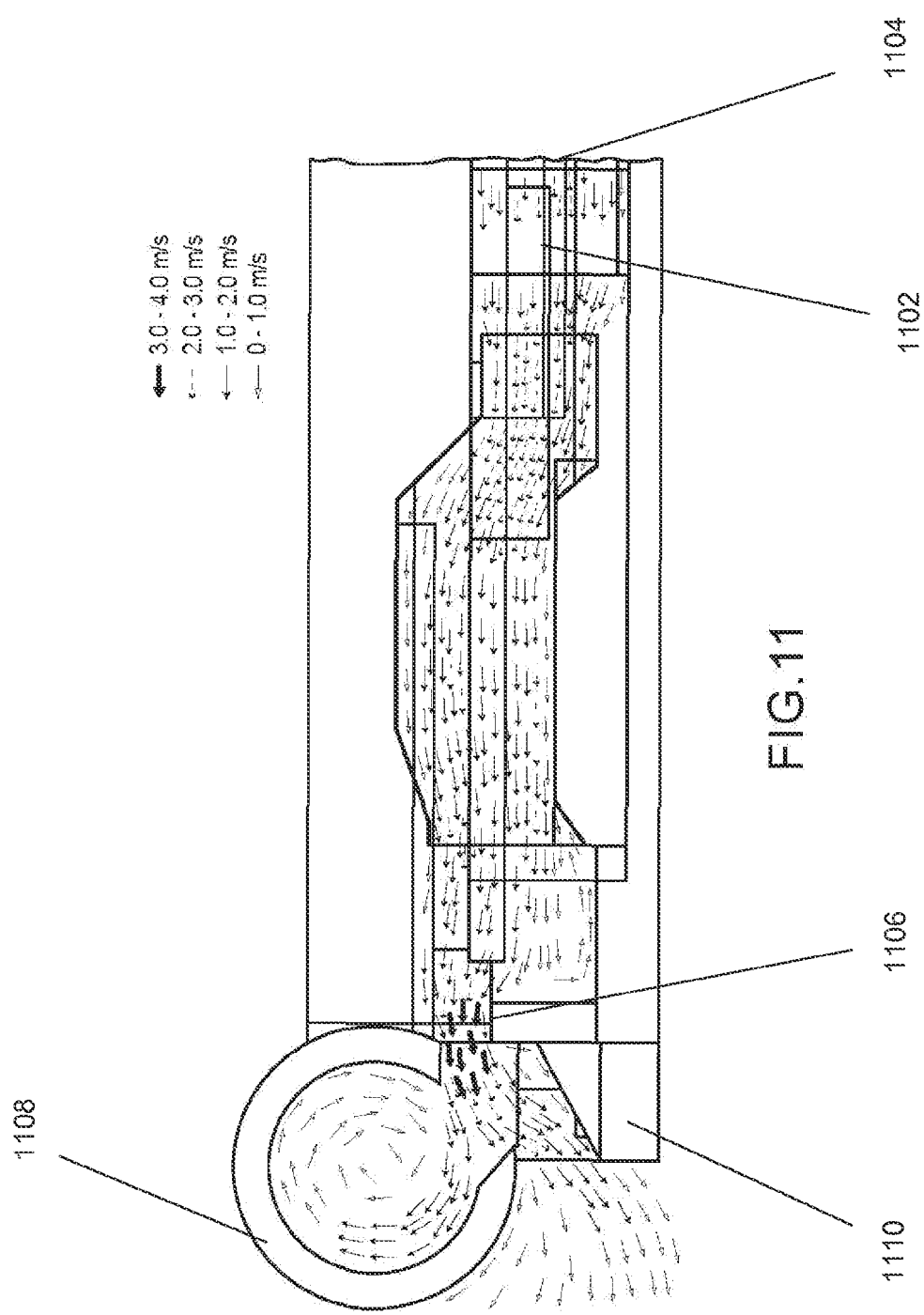
FIG. 11 is a schematic side view showing a model of airflow within the computing device.

FIG. 11 is a schematic side view showing a model of airflow within the computing device 100. A heat exhaust element (e.g., a fan) 1102 can draw air into an inlet port 1104 then can exhaust air out of an outlet port 1106 in a direction toward a hinge element 1108. Some of the exhaust air airflow can pass over a base frame member 1110 and into an inner cavity of the hinge element through a slot in the hinge element. Some of the exhaust air airflow can pass between the base frame member 1110 and the hinge element 1108 and out of the computing device 100. The air that enters the inner cavity of the hinge element 1108 can circulate within the cavity and can heat the wall of the hinge element 1108. The heated wall then can dissipate heat into the environment surrounding the computing device 100. Different area shown in the model of airflow of FIG. 11 show different speeds at which air flows within the computing device 100. For example, solid arrows with open heads indicate airflow of between zero and 1 m/s. Solid arrows with field and heads indicate airflow of between one and 2 m/s. Dashed arrows with open heads indicate airflow of between two and 3 m/s, and bold solid arrows with field and heads indicate airflow's of greater than 3 m/s.

In some embodiments, one or more portions of the components shown in the computing device 100 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer).

In some embodiments, the computing device 100 can be included in a network. In some embodiments, the network can include multiple computing devices and/or multiple server devices (not shown). Also, the computing device 100 can be configured to function within various types of network environments. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can be have portions based on various protocols such as Internet Protocol (IP) and/or a proprietary protocol. The network can include at least a portion of the Internet.

Memories within the base portion can be any type of memory device such as a random-access memory (RAM) component or a disk drive memory. In some embodiments, the memory can be implemented as more than one memory component (e.g., more than one RAM component or disk drive memory) within the computing device 100.

Processors disposed within the base portion 120 can include, by way of example, both general and special purpose microprocessors, and any one or more processors of any kind of digital computer. Generally, a processor will receive instructions and data from a read-only memory or a random access memory or both. Elements of the computing device 100 may include at least one processor for executing instructions and one or more memory devices for storing instructions and data. Generally, the computing device 100 also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display portion 110 that includes, e.g., a light emitting diode (LED) (e.g., organic LED) or liquid crystal display (LCD) monitor, for displaying information to the user. The computing device 100 may also include a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
    a base portion;
    a heat generating element disposed within the base portion;
    a metal hinge portion operably coupling the base portion to the display portion and operable to couple the base portion to the display portion between an open and a closed configuration;
    a heat exhaust element disposed within the base portion and operable to generate airflow over the heat generating element and toward the metal hinge portion to transfer heat away from the heat generating element and toward the metal hinge portion; and
    a display portion configured to display information to a user,
    wherein the hinge portion is disposed relative to the heat exhaust element such that when the heat exhaust element is operated to generate the airflow at least some of the heat transferred by the airflow over the heat generating device is exhausted away from the heat generating element to the hinge portion to heat the hinge portion as a result of the airflow being directed from the heat generating element toward the hinge portion and impinging on the hinge portion after flowing over the heat generating portion.

2. The apparatus of claim 1, wherein the heat generating element includes a processor.

3. The apparatus of claim 1, wherein the heat exhaust element includes a fan.

4. The apparatus of claim 3, wherein the metal hinge portion includes a hollow cavity and includes a first opening in an outer wall of the hinge portion, the opening being configured to receive the airflow, such that the airflow passes through the first opening and into the hollow cavity of the metal hinge portion.

5. The apparatus of claim 4, further comprising:
    at least one electrically conductive wire electrically coupling the base portion to the display portion;
    a second opening in an outer wall of the hinge portion configured for receiving the at least one electrically conductive wire from the base portion into the hollow cavity; and
    a third opening in the outer wall of the hinge portion, wherein the at least one electrically conductive wire exits the hollow cavity and passes into the display portion through the third opening.

6. The apparatus of claim 5, further comprising:
    a first gasket disposed within the third opening and fitting snugly against the at least one electrically conductive wire, such that airflow is substantially prevented from passing through the third opening into the display portion.

7. The apparatus of claim 4, wherein the metal hinge portion includes a plurality of metal fins extending substantially perpendicular from an inner wall of the hollow cavity into the hollow cavity.

8. The apparatus of claim 4, wherein the metal hinge portion includes a plurality of metal fins extending substantially perpendicular from an outer wall of the hinge portion and outward from the outer wall.

9. The apparatus of claim 4, wherein the metal hinge portion includes a roughly textured outer wall surface external to the hollow cavity.

10. The apparatus of claim 1, wherein the metal hinge portion comprises aluminum.

11. A computing device, comprising:
    a base portion housing a central processing unit;
    a metal hinge portion operably coupling the base portion to the display portion and being operable to couple the base portion to the display portion between an open and a closed configuration;
    a heat exhaust element disposed within the base portion and operable to move air past the central processing unit and toward the metal hinge portion;
    a display portion configured to display information to a user; and
    wherein the hinge portion includes a hollow cavity extending parallel to a longitudinal axis of the metal hinge and a longitudinal slot in a wall of the metal hinge and parallel to the longitudinal axis, the longitudinal slot being positioned relative to the heat exhaust element so as to receive air moved by the heat exhaust element past the central processing unit and through the slot for passage through the slot into the hollow cavity;
    to heat the hinge portion as a result of the airflow being directed from the heat generating element toward the hinge portion and impinging on the hinge portion after flowing over the heat generating portion.

12. The computing device of claim 11, wherein the heat exhaust element includes a fan.

13. The computing device of claim 11, wherein an airflow of the received air is received through the longitudinal slot substantially perpendicular to the longitudinal axis.

14. The computing device of claim 13, wherein the metal hinge portion includes a plurality of metal fins extending substantially perpendicular to an inner wall of the hollow cavity.

15. The computing device of claim 11, wherein the metal hinge portion includes an opening at an end of the metal hinge portion through which received air exits the hollow cavity into an environment surrounding the computing device.

16. The computing device of claim 15, wherein an airflow of the received air is received through the longitudinal slot substantially in a direction that includes a component parallel to the longitudinal axis.

17. The computing device of claim 15, wherein an airflow of the received air is received through the longitudinal slot, and wherein the airflow through the longitudinal slot has a velocity of at least two meters per second.

18. The computing device of claim 11, wherein the heat exhaust element includes a piezo-electric diaphragm pump.

19. The computing device of claim 11, wherein the base portion includes no cooling vents visible from outside the base computing device.

20. The computing device of claim 11, wherein the metal hinge portion obscures an outlet of the heat exhaust element, which exhausts air heated by passage of the air past the central processing unit, from view from outside the computing device.

* * * * *